United States Patent
Nath et al.

(10) Patent No.: US 10,625,740 B2
(45) Date of Patent: Apr. 21, 2020

(54) LANE CENTERING DISTURBANCE MITIGATION

(71) Applicant: Ford Global Technologies, LLC, Dearborn, MI (US)

(72) Inventors: Nitendra Nath, Troy, MI (US); Aaron L. Mills, Ann Arbor, MI (US); Danielle Rosenblatt, Dearborn, MI (US)

(73) Assignee: FORD GLOBAL TECHNOLOGIES, LLC, Dearborn, MI (US)

(*) Notice: Subject to any disclaimer, the term of this patent is extended or adjusted under 35 U.S.C. 154(b) by 207 days.

(21) Appl. No.: 15/873,997

(22) Filed: Jan. 18, 2018

(65) Prior Publication Data
US 2019/0217858 A1    Jul. 18, 2019

(51) Int. Cl.
| | | |
|---|---|---|
| *B60W 30/12* | (2020.01) |
| *G05D 1/02* | (2020.01) |
| *G06K 9/00* | (2006.01) |
| *G06K 9/46* | (2006.01) |
| *G06K 9/78* | (2006.01) |

(52) U.S. Cl.
CPC .......... *B60W 30/12* (2013.01); *G05D 1/0212* (2013.01); *G05D 1/0246* (2013.01); *G06K 9/00798* (2013.01); *G06K 9/4609* (2013.01); *G06K 9/78* (2013.01); *B60W 2420/42* (2013.01)

(58) Field of Classification Search
CPC .............. B60W 30/12; B60W 2420/42; G06K 9/00798; G06K 9/4609; G06K 9/78; G05D 1/0246; G05D 1/0212
USPC ............................................................ 701/25
See application file for complete search history.

(56) References Cited

U.S. PATENT DOCUMENTS

| | | | |
|---|---|---|---|
| 6,487,501 B1 | 11/2002 | Jeon | |
| 9,545,922 B1 | 1/2017 | Sim | |
| 2006/0217860 A1 | 9/2006 | Ihara | |
| 2008/0183342 A1* | 7/2008 | Kaufmann | B60K 28/066 701/1 |
| 2009/0067675 A1* | 3/2009 | Tan | G06K 9/00798 382/104 |
| 2010/0121518 A1* | 5/2010 | Tiernan | G01C 21/165 701/26 |
| 2010/0286866 A1* | 11/2010 | Buerkle | B60T 8/17557 701/33.4 |
| 2013/0179036 A1* | 7/2013 | Lee | B62D 15/0255 701/41 |

FOREIGN PATENT DOCUMENTS

| | | |
|---|---|---|
| JP | 3800901 B2 | 7/2006 |
| JP | 5266926 B2 | 8/2013 |
| JP | 20171565 A | 1/2017 |

\* cited by examiner

*Primary Examiner* — Muhammad Shafi
(74) *Attorney, Agent, or Firm* — Frank A. MacKenzie; Bejin Bieneman PLC

(57) ABSTRACT

A vehicle computer includes a memory and a processor programmed to execute instructions stored in the memory. The instructions include determining a first lane center, autonomously operating a host vehicle relative to the first lane center, detecting a change in the first lane center to a second lane center, selecting a filter, and applying the filter while transitioning autonomous operation of the host vehicle from the first lane center to the second lane center.

19 Claims, 8 Drawing Sheets

LANE CENTERING DISTURBANCE MITIGATION

BACKGROUND

An automotive lane departure warning system warns a driver when an equipped vehicle is inadvertently drifting toward or into a different lane. A lane centering system attempts to keep a vehicle centered between two lane markers.

DETAILED DESCRIPTION

Figure 1:
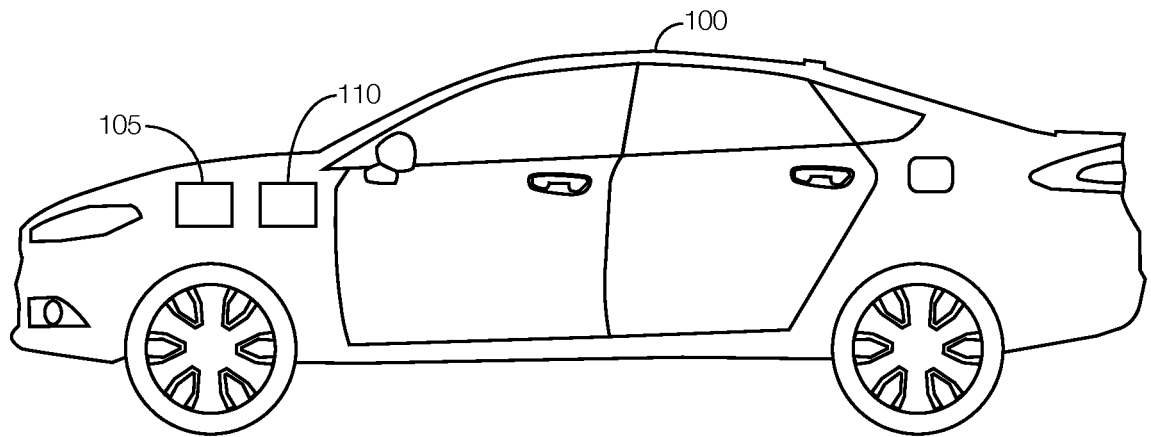
FIG. 1 illustrates an example vehicle with a lane centering system that mitigates disturbances.

Lane centering systems work by detecting lane markers on either side of the vehicle and autonomously controlling the vehicle to stay centered in the lane. Lane markers are not always present or detectable, however. For instance, when the vehicle goes under an overpass or is otherwise operating in a low-light environment, sensors supporting the lane centering system may not be able to detect one or both lane marks. Another issue arises when one or both lane markers is not present. Lane markers may disappear as the paint on the road wears away over time. Some sections of the road purposely omit one of the lane marks. For example, when two lanes merge or diverge, including at entrance ramps and exit ramps, sometimes one lane marker is omitted for a brief period of time to signal where vehicles can pass from one lane to the next.

Accordingly, simply losing sight of a lane marker does not mean that the lane centering system should attempt to re-center the vehicle in the lane, especially because re-centering the vehicle after suddenly losing sight of a lane marker can cause a disturbance (also called a "jump"). The disturbance may be in the form of one or more sudden lateral lurches that are unpleasant for the vehicle occupants.

One way to mitigate such disturbances is with vehicle lane centering, implemented by a vehicle computer with a memory and a processor. The processor is programmed to execute instructions stored in the memory. The instructions include determining a first lane center, autonomously operating a host vehicle relative to the first lane center, detecting a change in the first lane center to a second lane center, selecting a filter, and applying the filter while transitioning autonomous operation of the host vehicle from the first lane center to the second lane center.

The first lane center may be defined by a first lane marker and a second lane marker and the second lane center may be defined by the first lane marker and not the second lane marker. In that instance, the processor may be programmed to detect the first lane marker and the second lane marker from an image captured by a camera. The processor may be programmed to detect the first lane marker and the second lane marker by applying an image processing technique to the image captured by the camera.

Selecting the filter may include selecting from among at least one of a low filter, a moderate filter, a high filter, and a coasting filter. Selecting and applying the low filter may cause the processor to operate the host vehicle toward the second lane center more quickly than selecting and applying the coasting filter, the high filter, or the moderate filter. Selecting and applying the moderate filter cause the processor to operate the host vehicle toward the second lane center more quickly than selecting and applying the coasting filter or the high filter. Selecting and applying the high filter may cause the processor to operate the host vehicle toward the second lane center more quickly than selecting and applying the coasting filter.

Selecting the filter may include determining a steerable path prediction confidence level and selecting the filter according to the steerable path prediction confidence level.

Selecting the filter may include detecting a steerable path prediction model change and selecting the filter according to the steerable path prediction model change.

A vehicle lane centering system includes a camera programmed to capture a first image of an area ahead of a host vehicle, the image including a first lane marker and a second lane marker and a processor programmed to process the first image to determine a first lane center based on the first lane marker and the second lane marker and autonomously operate the host vehicle relative to the first lane center. The camera is programmed to capture a second image including the first lane marker and not the second lane marker, and the processor is programmed to process the second image to determine a second lane center different from the first lane center, select a filter, and apply the filter while transitioning autonomous operation of the host vehicle from the first lane center to the second lane center.

The first lane center may be defined by a first lane marker and a second lane marker and the second lane center may be defined by the first lane marker and not the second lane marker. The processor may be programmed to detect the first lane marker and the second lane marker in the first image by applying an image processing technique to the first image captured by the camera. The processor may be programmed to detect the first lane marker in the second image by applying the image processing technique to the second image captured by the camera.

Selecting the filter may include selecting from among at least one of a low filter, a moderate filter, a high filter, and a coasting filter. Selecting and applying the low filter may cause the processor to move the host vehicle toward the second lane center more quickly than selecting and applying the coasting filter, the high filter, or the moderate filter. Selecting and applying the moderate filter may cause the processor to move the host vehicle toward the second lane center more quickly than selecting and applying the coasting filter or the high filter. Selecting and applying the high filter may cause the processor to move the host vehicle toward the second lane center more quickly than selecting and applying the coasting filter.

Selecting the filter may include determining a steerable path prediction confidence level and selecting the filter according to the steerable path prediction confidence level.

Selecting the filter may include detecting a steerable path prediction model change and selecting the filter according to the steerable path prediction model change.

The elements shown may take many different forms and include multiple and/or alternate components and facilities. The example components illustrated are not intended to be limiting. Indeed, additional or alternative components and/or implementations may be used. Further, the elements shown are not necessarily drawn to scale unless explicitly stated as such.

Figure 2:
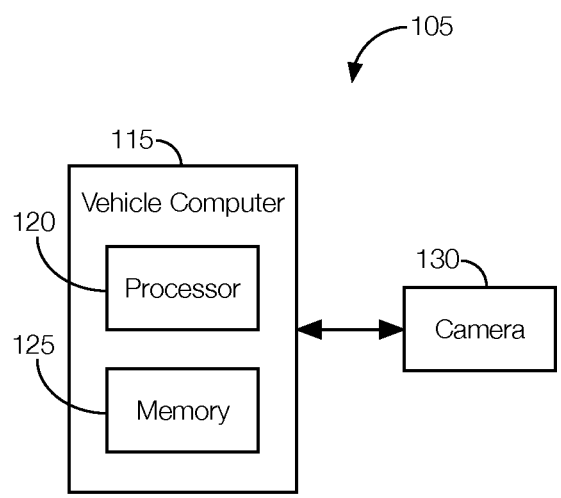
FIG. 2 is a block diagram illustrating example components of the vehicle and the lane centering system.

As illustrated in FIGS. 1 and 2, a host vehicle 100 includes a virtual driver system 105 and an automated vehicle platform 110 that executes lane centering, which includes keeping the host vehicle 100 centered between two lane markers. At least some parts of the virtual driver system 105 may be implemented by a vehicle computer 115 (sometimes called an autonomous vehicle controller) having a processor 120 and a memory 125. Although illustrated as a sedan, the host vehicle 100 be a passenger or commercial automobile such as a car, a truck, a sport utility vehicle, a crossover vehicle, a van, a minivan, a taxi, a bus, etc. The virtual driver system 105 and the automated vehicle platform 110 may allow the host vehicle 100 to operate in an autonomous (e.g., driverless) mode, a partially autonomous mode, and/or a non-autonomous mode. The partially autonomous mode may refer to the SAE Level 2 mode of operation where the host vehicle 100 can control steering, acceleration, and braking, individually or in combination, under certain circumstances without human interaction. The partially autonomous mode may further refer to the SAE Level 3 mode of operation where the host vehicle 100 can handle steering, acceleration, and braking, individually or in combination, under certain circumstances, as well as monitoring of the driving environment, even though some human interaction is sometimes needed. Fully autonomous operations taken by the host vehicle 100 may be consistent with SAE Levels 4 or 5 modes of operation.

The virtual driver system 105 is a computing platform, implemented via sensors, controllers, circuits, chips, and other electronic components, that control various autonomous or partially autonomous operations of the host vehicle 100. The virtual driver system 105 includes an autonomous vehicle controller programmed to process the data captured by the sensors, which may include a camera 130 as well as, e.g., a lidar sensor, a radar sensor, ultrasonic sensors, etc. The autonomous vehicle controller is programmed to output control signals to components of the automated vehicle platform 110 to autonomously control the host vehicle 100 according to the data captured by the sensors.

The automated vehicle platform 110 refers to the components that carry out the autonomous vehicle operation upon instruction from the virtual driver system 105, and specifically, from an autonomous vehicle controller. As such, the automated vehicle platform 110 includes various actuators incorporated into the host vehicle 100 that control the steering, propulsion, and braking of the host vehicle 100. The automated vehicle platform 110 further includes various platform controllers (sometimes referred to in the art as "modules"), such as a chassis controller, a powertrain controller, a body controller, an electrical controller, etc. Each actuator is controlled by control signals output by the vehicle computer 115 or one of the platform controllers. Electrical control signals output by the vehicle computer 115 or platform controller may be converted into mechanical motion by the actuator. Examples of actuators may include a linear actuator, a servo motor, or the like.

The camera 130 is a vision sensor that is programmed to capture images of an area ahead of the host vehicle 100, including the roadway on which the host vehicle 100 is traveling. To capture such images, the camera 130 may include a lens that projects light toward, e.g., a CCD image sensor, a CMOS image sensor, etc. The camera 130 processes the light and generates the image. The image may be output to the vehicle computer 115 and, as discussed in greater detail below, can be used to detect lane markings on the roadway, confirm that the host vehicle 100 is centered between the lane markers, determine whether the lane centering system is working properly, etc. Some images captured by the camera 130 may include a first lane marker 135 (see FIGS. 5A-6B) on one side of the host vehicle 100 and a second lane marker 140 (see FIGS. 5A-6B) on the other side of the host vehicle 100. Other images captured by the camera 130 may include only the first lane marker 135 or the second lane marker 140, but not both, for at least some stretch of the road. This may occur when, e.g., the host vehicle 100 is approaching an entrance ramp or an exit ramp, where two lanes merge, where the lane marker has worn away over time, when visibility is low (which may occur because of the weather, because the host vehicle 100 is traveling through a tunnel or under a bridge, etc.), or the like.

The memory 125 is implemented via circuits, chips or other electronic components and can include one or more of read only memory (ROM), random access memory (RAM), flash memory, electrically programmable memory (EPROM), electrically programmable and erasable memory (EEPROM), embedded MultiMediaCard (eMMC), a hard drive, or any volatile or non-volatile media etc. The memory 125 may store instructions executable by the processor 120 and data such as the images captured by the camera 130. The instructions and data stored in the memory 125 may be accessible to the processor 120 and possibly other components of the virtual driver system 105, the host vehicle 100, or both.

The processor 120 is implemented via circuits, chips, or other electronic component and may include one or more microcontrollers, one or more field programmable gate arrays (FPGAs), one or more application specific integrated circuits (ASICs), one or more digital signal processors (DSPs), one or more customer specific integrated circuits, etc. The processor 120 can receive the data from the sensors, such as the image captured by the camera 130, and determine, from the image whether the host vehicle 100 is centered between two lane markers. The processor 120 may be further programmed to output control signals to the actuators to, e.g., keep the host vehicle 100 centered between the lane markers using images captured by the camera 130 as feedback.

The processor 120 may be programmed to perform an image processing technique on the images captured by the camera 130 to identify the first lane marker 135 and the second lane marker 140 in the image. The processor 120 may be further programmed to determine a center between the first lane marker 135 and the second lane marker 140 and output control signals that keep the host vehicle 100 centered between the first lane marker 135 and the second lane marker 140. The processor 120 may continue to do so periodically, such as for each image (or frame) captured by the camera 130. Periodically recentering the host vehicle 100 may be referred to below as the recentering action.

If the processor 120 only detects one of the lane markers (such as the first lane marker 135), the processor 120 may apply a path filter to the recentering action to prevent the host vehicle 100 from taking a drastic measure (i.e., lurching laterally) that startles the vehicle occupant or otherwise makes the vehicle occupant uncomfortable. If the camera 130 loses sight of one of the lane markers, without the path filter, the processor 120 may determine that the center has moved a large distance toward the missing lane marker. In other words, without the path filter, the processor 120 may misinterpret the missing lane marker as a sudden increase in the distance between the first lane marker 135 and the second lane marker 140. Applying the path filter to the recentering action prevents the processor 120, and thus the host vehicle 100, from immediately reacting to the sudden perceived increase in the distance between the first lane marker 135 and the second lane marker 140.

The processor 120 may be programmed to apply any number of path filters, and different path filters may be applied under different circumstances. The processor 120 may be programmed to consider various factors when selecting which path filter to apply. The factors may include the output of the camera 130 (including some processing of the images captured by the camera 130), steerable path prediction (SPP) parameters, a reported SPP confidence, a change in the SPP prediction model, a change in the SPP coefficients (see Equation 1) that can be used to infer the situation or path, or the like.

An example path filter with SPP coefficients is shown in Equation 1, $$y(x)=a_0+a_1x+a_2x^2+a_3x^3, \quad (1)$$

where y(x) represents the lateral distance between the path and the centerline of the host vehicle 100 at x range, $a_0$ represents the lateral distance between the path and the centerline of the host vehicle 100 at its origin, $a_1$ represents the steering path heading angle, $a_2$ represents the steering path curvature at the origin point, and $a_3$ represents the steering path curvature rate.

The processor 120 may be programmed to apply different path filters given the circumstances. Examples of different path filters may include a light path filter, a moderate path filter, a heavy path filter, and a coasting filter. The light path filter may be selected when recentering the host vehicle 100 will not result in a sudden lateral lurch. The light path filter may apply, therefore, in circumstances where both lane markers are visible or where one lane marker disappears very briefly (on the order of milliseconds). As a result of applying the light path filter, the processor 120 may allow the host vehicle 100 to recenter itself. The moderate path filter may be applied to allow some recentering (although less than when light path filtering is applied) but not enough to cause a sudden and significant lateral lurch. The moderate path filter may be selected when one lane marker is not detectable for, e.g., up to a second among other factors. The heavy path filter may be applied to allow very little recentering (less than when moderate path filtering is applied) to prevent a sudden and significant lateral lurch. The heavy path filter may be selected when one lane marker is not detectable for, e.g., several seconds among other factors. The coasting filter may be applied to prevent the host vehicle 100 from recentering at all. The coasting filter may be selected when one lane marker is not detectable for, e.g., more than several seconds among other factors. The coasting filter, therefore, may keep the host vehicle 100 where it is relative to the lane marker that is detectable.

Figure 3:
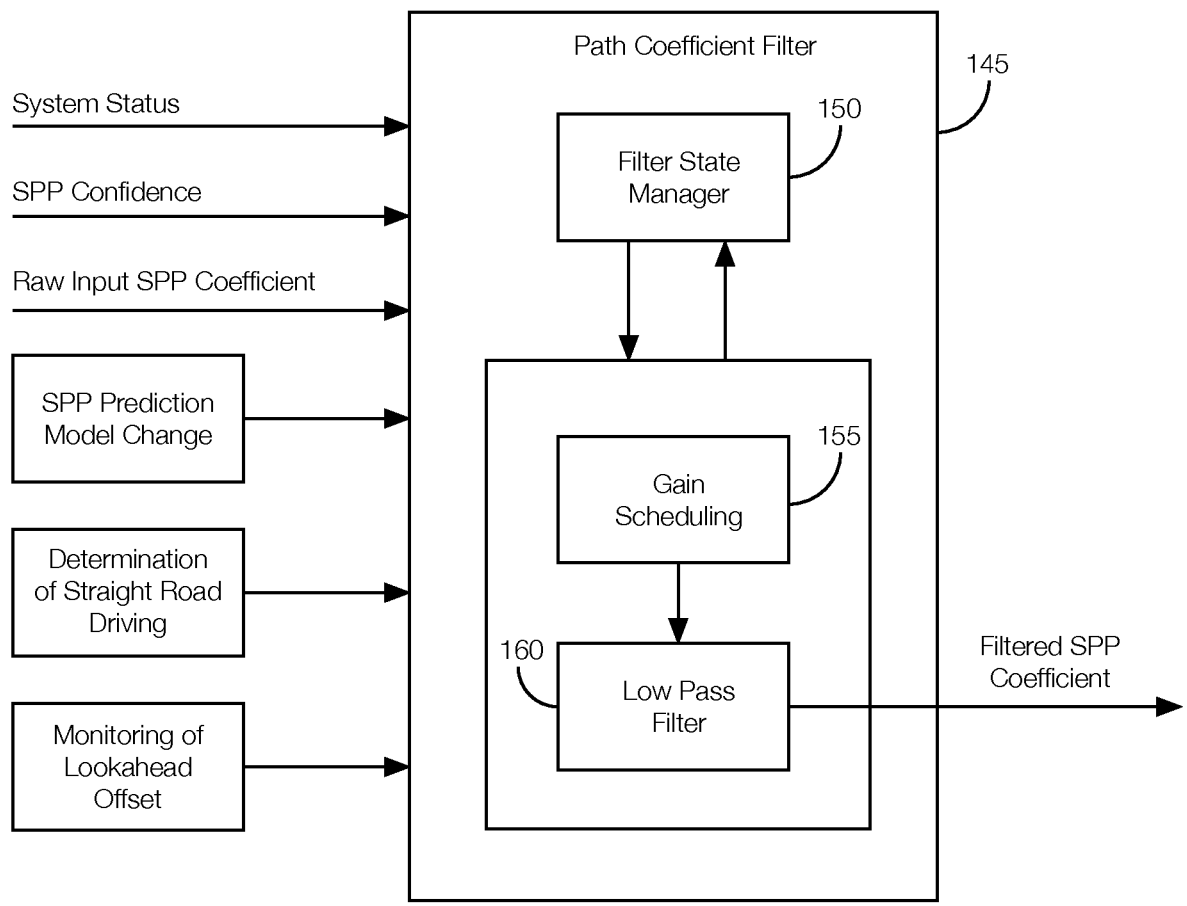
FIG. 3 is a block diagram representing inputs and outputs of the lane centering system.

FIG. 3 illustrates example inputs and outputs of an example lane centering implementation performed by the processor 120. The inputs include system status, SPP confidence, and raw SPP coefficients. Additional inputs include SPP prediction model changes, whether the host vehicle 100 is driving straight (as opposed to turning or on a curved road), and a lookahead offset. The implementation further includes a path coefficient filter 145 that outputs a filtered SPP coefficient. The path coefficient filter 145 includes a filter state manager 150 in communication with a gain scheduling block 155 and has a low pass filter block 160. The output of the low pass filter block 160 is the filtered SPP coefficient.

The system status represents the overall status of the lane centering system. The system status may include an "active" status and a "canceled" status. The path coefficient filter 145 may be activated when the system status is "active." The path coefficient filter 145 may be reset and its operations canceled with the status is "canceled."

The SPP confidence may represent the confidence of the predicted steerable path from the sensor. Example confidence levels may include "invalid," "low," "medium," and "high." "Invalid" may refer to an instance where the confidence cannot be determined from the sensor data. "Low" may reflect a low level of certainty in the sensor data, "medium" may reflect a moderate level of certainty in the sensor data, and "high" may reflect a high level of certainty in the sensor data. The path coefficient filter 145 may process data differently given the different SPP confidence levels. For instance, the path coefficient filter 145 may not do anything in response to "invalid" sensor data and may react slowly to sensor data with "low" confidence. The path filter may immediately process sensor data with "medium" and "high" levels of confidence.

The SPP prediction model change input may include logic to determine if the SPP prediction model has changed. Examples of prediction models include a "both lane model" (BLM), a "right lane model" (RLM), a "left lane model" (LLM), and a "PO-only model (Lead Vehicle Trail)." The "both lane model" may apply when both lane markers are present and detected by the sensors. The "right lane model" may apply when only the right lane is detected by the sensors. The "left lane model" may apply when only the left lane is detected by the sensors. The "PO-only model" may apply when the host vehicle 100 is in a platoon or otherwise following a lead vehicle. The path coefficient filter 145 may use a change in the model as an indicator that recentering may be needed.

Determining that the road is straight may involve a logic block that computes the moving average of the road curvature over the last "n" seconds where "n" is a tunable parameter on the order of, e.g., 3 seconds. The path coefficient filter 145 may be programmed to act on the SPP model if, e.g., the host vehicle 100 has been traveling straight for at least the last "n" seconds when the path coefficient filter 145 is activated. In other words, traveling on a straight road for at least "n" seconds may be threshold for applying the path coefficient filter 145.

The monitoring of the look ahead offset may be implemented via a logic block that computes the offset at a lookahead time on the order of, e.g., 1 second. The lookahead time may be a function of the SPP polynomial shown in Equation 1. The logic block may apply the offset at a time when the path coefficient filter 145 is triggered for, e.g., the next 2 seconds. If another SPP model change occurs within that time (i.e., within those 2 seconds), regardless of the confidence in that model change, resulting in the offset returning to where it was at the time the path coefficient filter 145 was activated, the path coefficient filter 145 may respond aggressively to the SPP model change.

Figure 4:
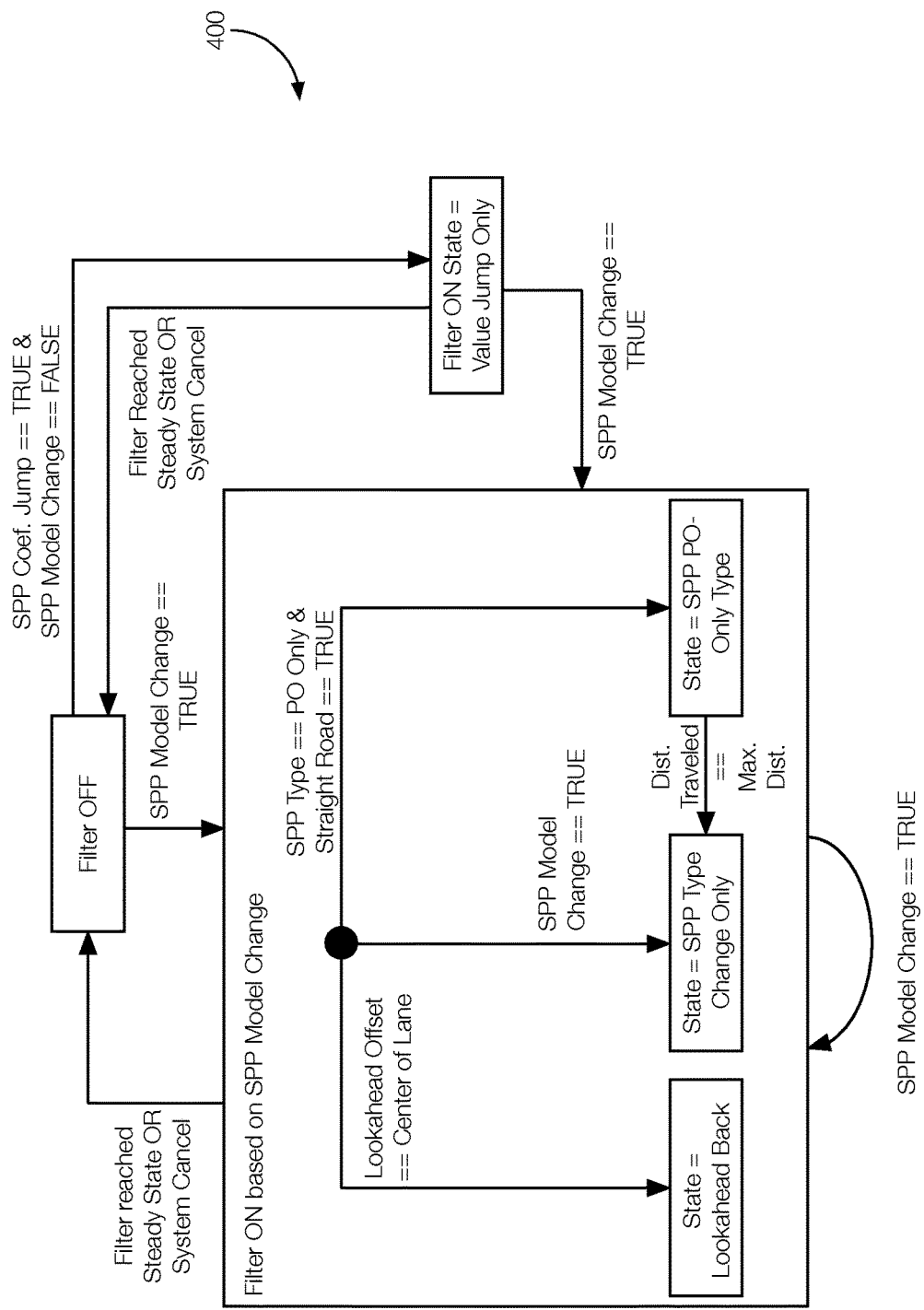
FIG. 4 is a state diagram representing states of a filter state manager shown in FIG. 3.

The path coefficient filter 145 may further include the filter state manager 150 and the filter itself. The filter may include the gain scheduling block 155 and the low pass filter block 160. The filter state manager 150 is a logic block that determines the state of the filter based on its trigger (or activation) condition. Example operations of the filter state manager 150 are shown in the state diagram 400 of FIG. 4. The filter state manager 150 turns the path coefficient filter 145 "off" when the filter has reached a steady state or the lane centering system is turned off or canceled. The filter manager may have the path coefficient filter 145 operate in an "on" state as a result of the SPP coefficient changing even if there is no change in the SPP model. In that instance, the "on" state may refer to a value change only state until the SPP model change occurs. The path coefficient filter 145 may also be operated in the "on" state immediately in instances where the SPP model changes (regardless of the SPP coefficient and regardless of the present operating state, including if the path coefficient filter 145 is already operating in the "on" state).

When operating in the "on" state, the filter state manager 150 may consider the SPP type, whether the host vehicle 100 is operating on a straight road, the lookahead offset, the center of the lane, etc. The default state may be "SPP type change only" meaning that the default is for the state to change to the present SPP model changes if, e.g., the SPP model changes. One exception to the default occurs if the SPP type is "Primary Object (PO) only" (i.e., the host vehicle 100 is coasting or following a lead vehicle) and the host vehicle 100 is operating on a straight road. In that case, the filter state manager 150 may set the state of the path coefficient filter 145 to "SPP PO only type." Another exception may be if the lookahead offset is equal to the center of the lane. In that case, the state may be "lookahead back," which as discussed above may refer to SPP model changes that return the offset back to where it was at the time of the filter trigger within, e.g., 2 seconds.

The filter state manager 150 passes the state to the gain scheduling block 155 which determines, in accordance with the SPP model confidence and the magnitude of the value jump change, the gain that needs to be used with the path coefficient filter 145. The filter levels (low, moderate, high, and coasting) are discussed above.

One example scenario occurs when the SPP model changes and the SPP confidence is not low (i.e., two lane markings are detected, one lane marking with the host vehicle 100 following a lead vehicle in a PO trail is detected, etc.). In that instance, the low filter may be selected. If a value jump (i.e., a difference between the calculated center of the lane before and after losing sight of one or both lane markers) occurs while the filter is running, the filter block may apply either high filter or coasting filter (depending on whether the value jump was high or low) until the value difference is reduced. This scenario may occur when there is higher uncertainty (i.e., when the SPP model change occurs contemporaneously or nearly contemporaneously with a value jump).

Another example scenario occurs when the SPP model changes and the SPP confidence is low (i.e., only one lane marking is detected, no lane markings are detected but the host vehicle 100 is following a lead vehicle in a PO trail, etc.). In this example scenario, the filter may apply a high gain if the SPP confidence is low with only one lane marking detected. In the instance where no lane markings are detected but the host vehicle 100 is following the lead vehicle in a PO trail, the path coefficient filter 145 may further be programmed to consider whether the host vehicle 100 has been driving straight for the last n seconds. In that scenario, the coasting filter may be selected until the host vehicle 100 has traveled a predetermined distance. When the host vehicle 100 has traveled the predetermined distance, the path coefficient filter 145 may transition to the SPP model change state and select an appropriate gain.

Another example scenario occurs when there is a difference between an incoming coefficient value and a previous coefficient value (i.e., a value jump) without an SPP model change. In that instance, a moderate filter may be selected. If there is a large value jump while a moderate filter is applied, the gain may transition to either a high filter or coasting filter for a number of samples, on the order of, e.g., 2 samples, until the value difference is reduced. This situation may point toward higher uncertainty in the sensor readings since, e.g., a big value jump was followed by another value jump.

Another example scenario occurs when the filter state changes based on the lookahead monitoring and the gain transitions to a low filter regardless of the previous gain. The lookahead monitoring state suggests that the SPP model changed within the last, e.g., 2 seconds, and this change may bring the offset of the host vehicle 100 from the center of the lane back to the previous center value (or close to the previous center value) when the SPP model change occurred. This scenario suggests that the host vehicle 100 has found its previous center regardless of whether the SPP confidence was previously low, medium, or high.

Figure 5A:
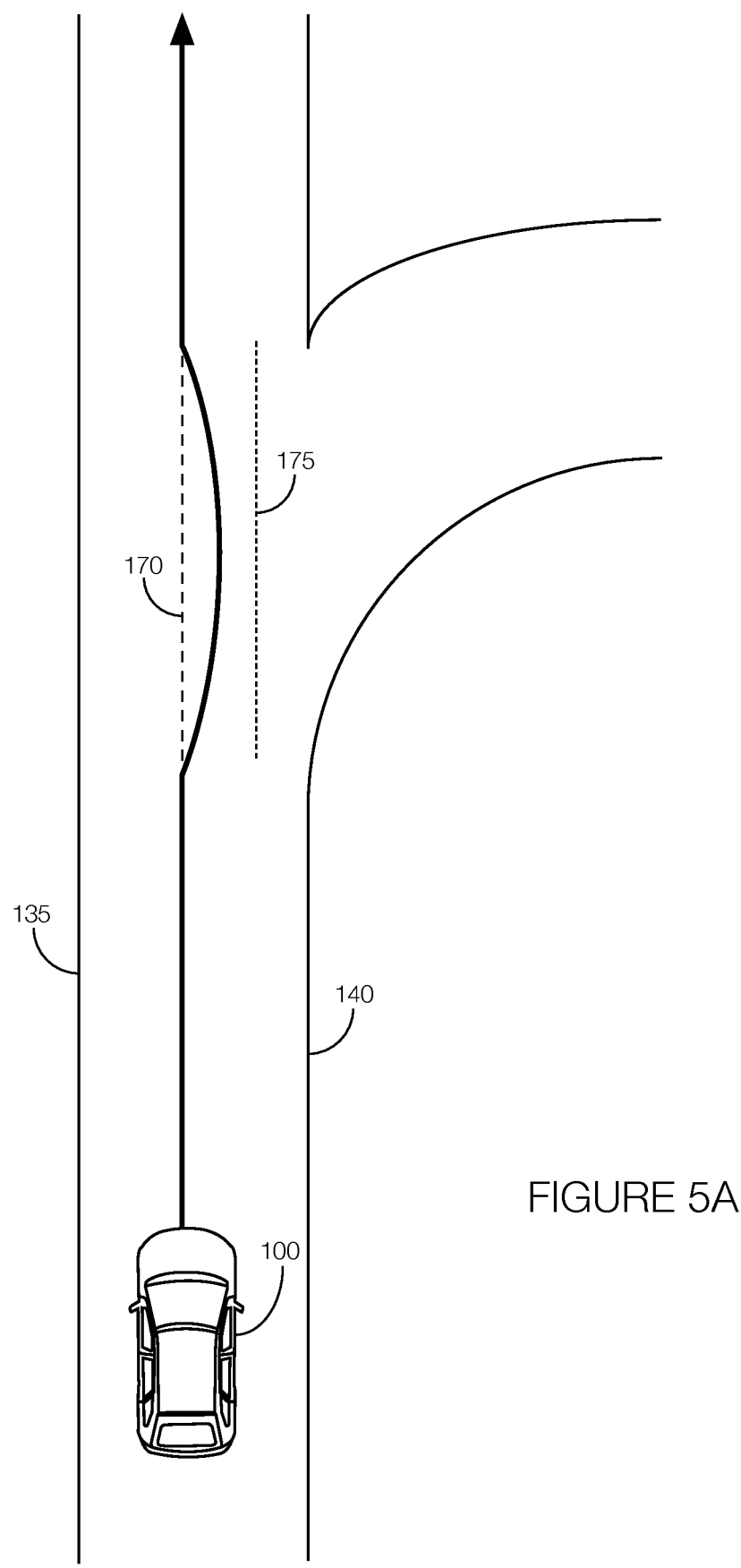
FIGS. 5A and 5B illustrate the path of the vehicle with the lane centering system that mitigates disturbances relative to the path of a vehicle without the lane centering system when approaching an exit ramp.
Figure 5B:
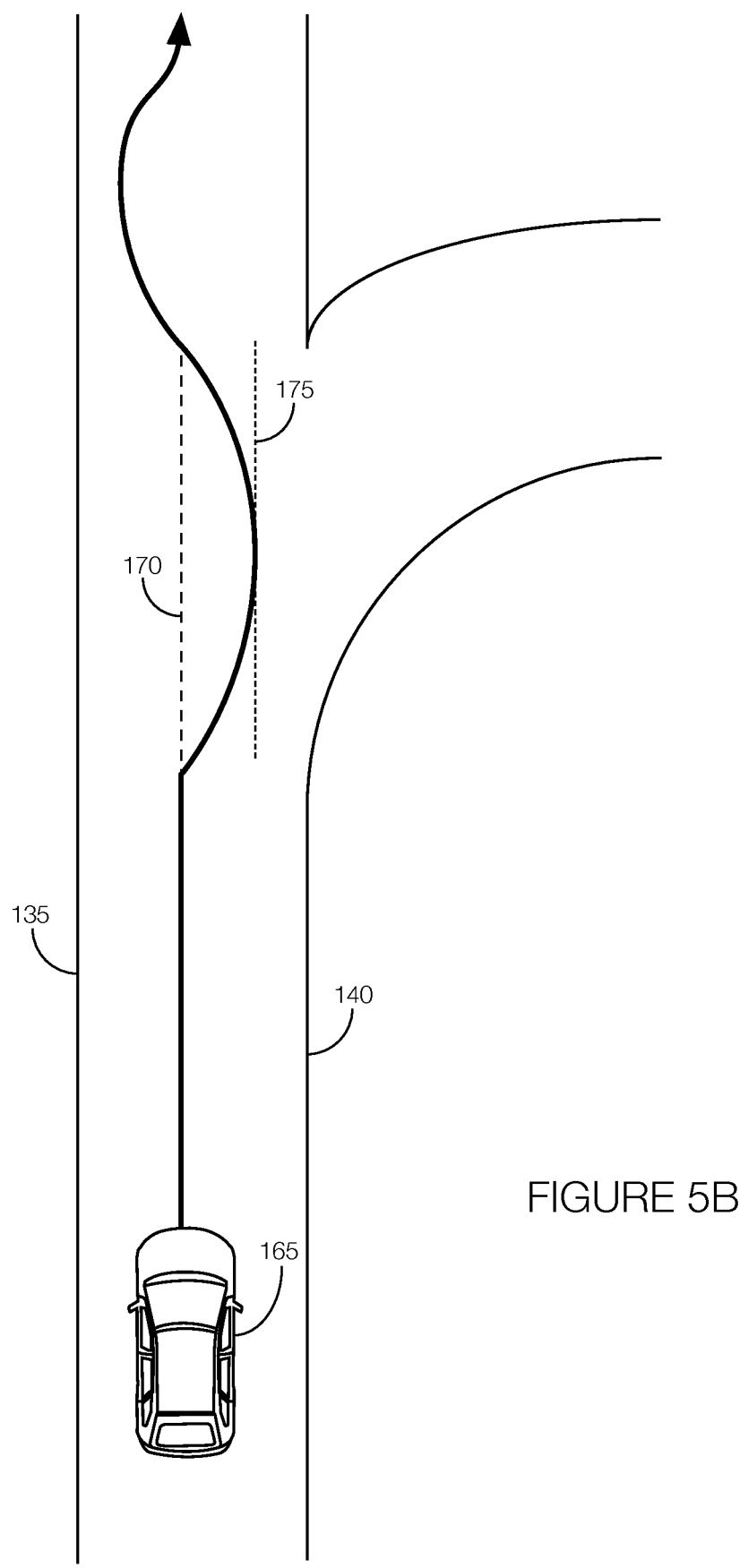

FIG. 5A illustrates an example scenario where the vehicle computer 115 mitigates disturbances of the host vehicle 100 as a result of losing sight of one of the lane markers (i.e., the host vehicle 100 switches from operating in a both lane model to a left lane model). The path of the host vehicle 100 is shown by line 505. FIG. 5B illustrates an exaggerated path (line 510) a non-equipped vehicle 165 may take under the same circumstances. As shown, the host vehicle 100 and the non-equipped vehicle 165 are approaching an exit ramp while following a first lane center 170 (defined by a first lane marker 135 and a second lane marker 140) but neither vehicle intends to exit. The sensors of both the host vehicle 100 and the non-equipped vehicle 165 lose sight of the right-hand lane marker (i.e., the second lane marker 140), causing the host vehicle 100 to switch to a left lane model (i.e., a model where only the first lane marker 135 is visible to the sensors of the host vehicle 100 and of the non-equipped vehicle 165) with a second lane center 175 (defined by only one lane marker, such as the first lane marker 135, or no lane markers, as a result of a gap in the second lane marker 140 that occurs because of the exit ramp) offset from the first lane center 170. Both vehicles start to drift toward the right (i.e., toward the second lane center 175) since the lack of the second lane marker 140 moves the perceived center of the lane in that direction. In FIG. 5A, the vehicle computer 115 of the host vehicle 100 recognizes the missing lane marker and applies a gain filter to slowly recenter the host vehicle 100 from the second lane center 175 to the first lane center 170. In FIG. 5A, the vehicle computer 115 responds before the host vehicle 100 reaches the second lane center 175. In FIG. 5B, the non-equipped vehicle 165 drifts to the right somewhat abruptly toward the second lane center 175, causing the driver to intervene. The driver's intervention pulls the vehicle to the left overshooting the first lane center 170 before eventually stabilizing the non-equipped vehicle 165.

Figure 6A:
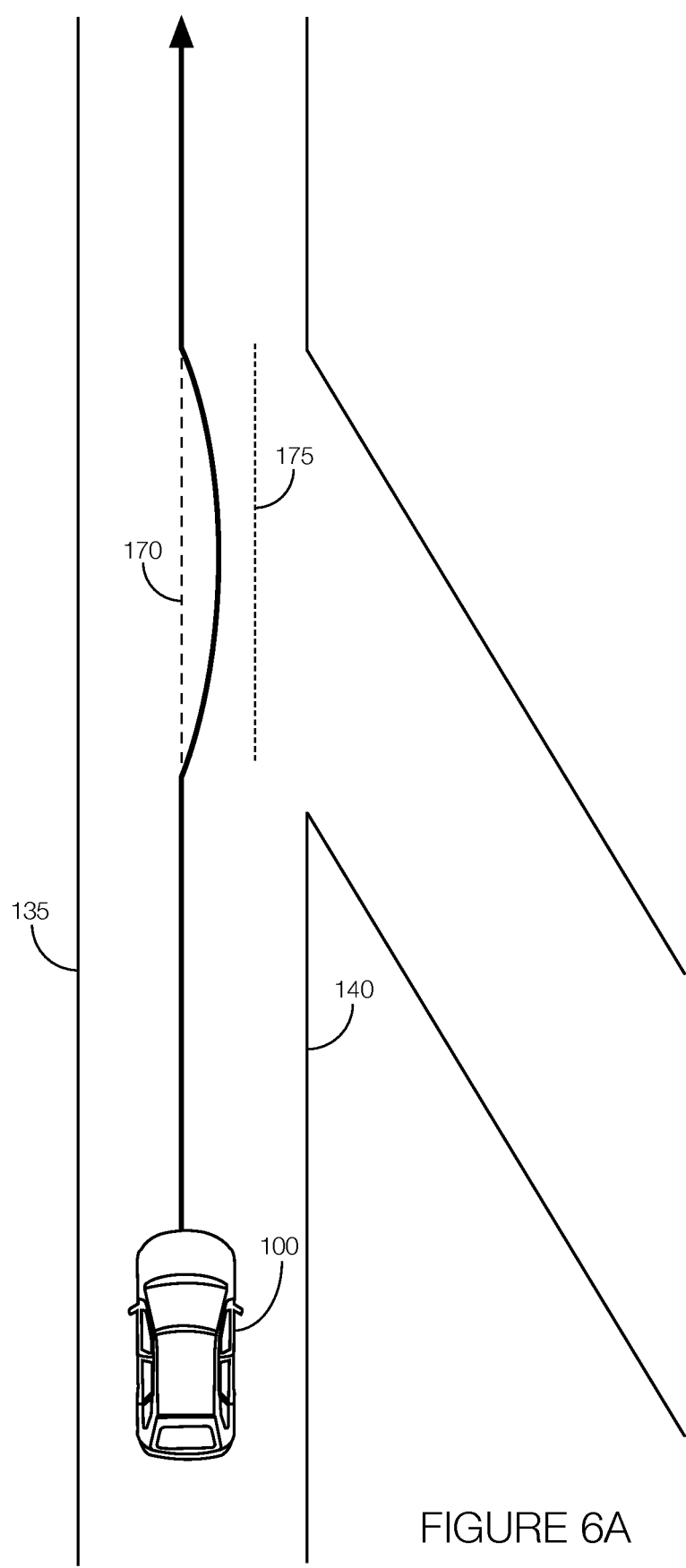
FIGS. 6A and 6B illustrate the path of the vehicle with the lane centering system that mitigates disturbances relative to the path of a vehicle without the lane centering system when approaching an entrance ramp.
Figure 6B:
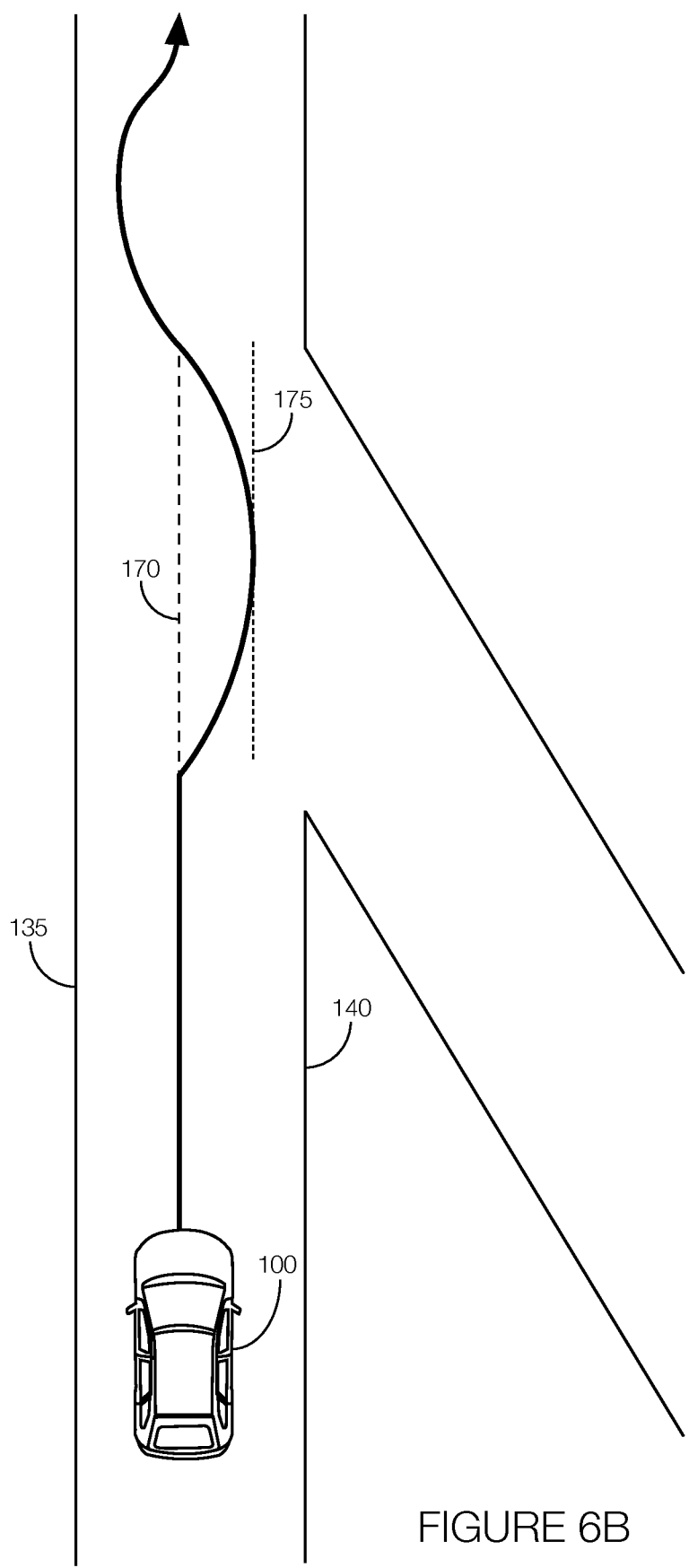

Similar events occur in the scenario where the host vehicle 100 and the non-equipped vehicle 165 approach an entrance ramp as shown in FIGS. 6A and 6B. Both vehicles lose sight of the second lane marker 140, which is shown to the right of the host vehicle 100 and the non-equipped vehicle 165. As shown in FIG. 6A, the vehicle computer 115 of the host vehicle 100 recognizes the circumstance and applies the appropriate gain to mitigate the disturbance as the host vehicle 100 is operated back toward the first lane center 170. As shown in FIG. 6B, the non-equipped vehicle 165 drifts more dramatically toward the right causing the driver to intervene and overshoot the first lane center 170.

Although not shown, similar events occur when the sensors of the host vehicle 100 lose sight of the first lane marker 135 or second lane marker 140 under different circumstances, such as low light conditions (which may occur when the host vehicle 100 travels under an overpass or the road is not adequately lit at night), low visibility situations (which may occur during poor weather conditions), at intersections, etc.

Figure 7:
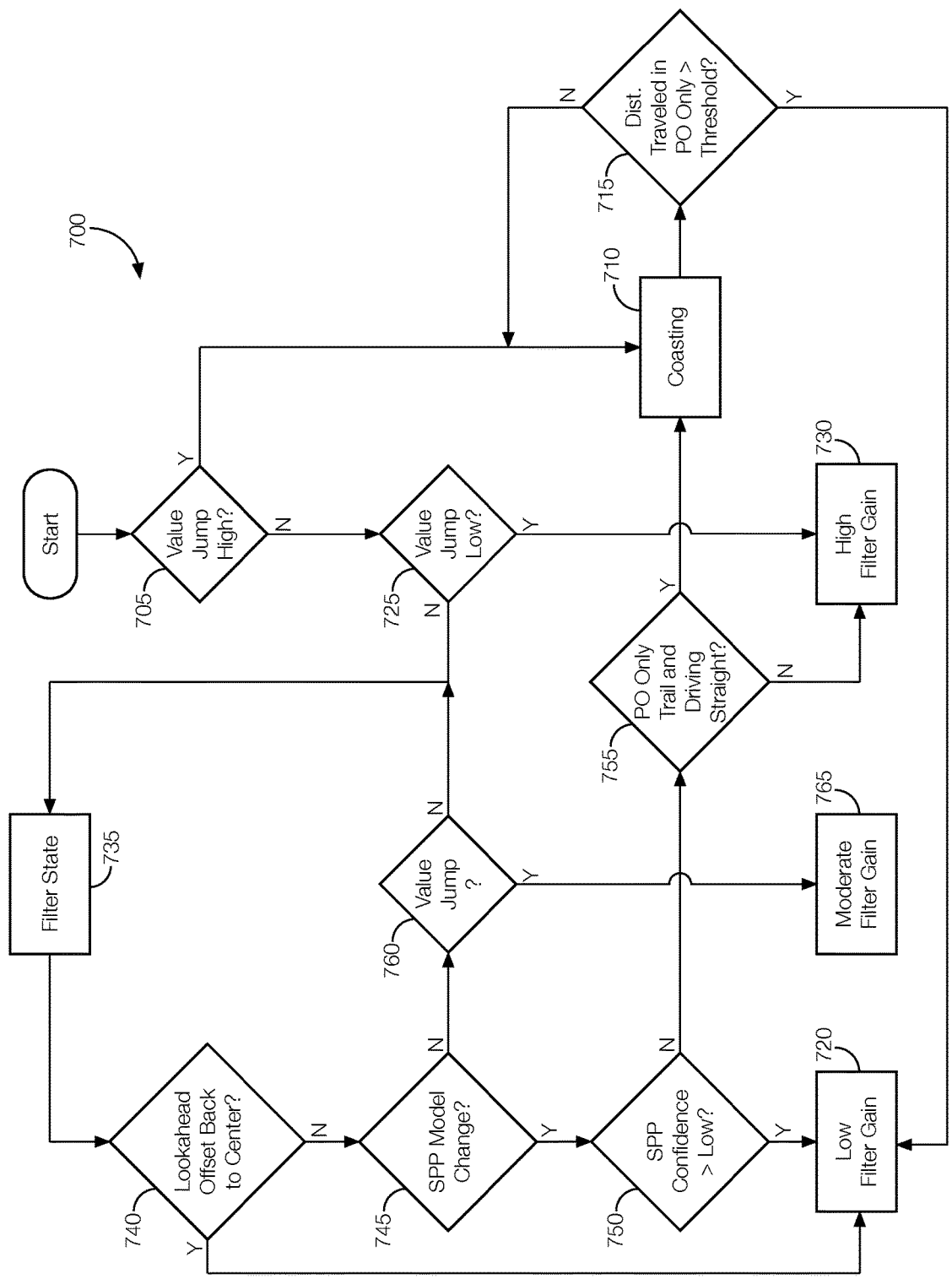
FIG. 7 is a flowchart of an example process that may be executed by the lane centering system to mitigate disturbances.

FIG. 7 is a flowchart of an example process 700 that may be executed by the vehicle computer 115 while implementing lane centering to, e.g., mitigate disturbances resulting from a situation where the sensors of the host vehicle 100 cannot detect one lane. The process 700 may begin any time the host vehicle 100 is operating and the vehicle computer 115 is applying filtering. At decision block 705, the vehicle computer 115 determines if the value jump was high, meaning that there was an immediate and significant change to the perceived center of the lane. If so, the process proceeds to block 710 where the vehicle computer 115 provides the coasting gain filter. As discussed above, applying the coasting gain filter may effectively prevent the host vehicle 100 from responding to the value jump. From there, the process 700 may proceed to decision block 715 where the vehicle computer 115 compares the distance traveled in its present state (coasting or PO-only) relative to a threshold. If the distance traveled is below the threshold, the process 700 may continue to coast (block 710) and continue to reevaluate the distance relative to the threshold (block 715). If the distance is greater than the threshold, the process 700 may proceed to block 720 where a low filter is applied until, e.g., the missing lane marker(s) reappears or another value jump occurs. If another value jump occurs, the process 700 may proceed to block 705 from block 720. If the result of decision block 705 is "no," meaning that the vehicle computer 115 does not determine that the value jump is high, the process 700 may proceed to decision block 725 where the vehicle computer 115 determines if the value jump is low. If so, the process 700 may proceed to block 730 where a high filter is applied. The process 700 may return to block 705 from block 730 when the next value jump occurs. If the outcome of decision block 725 indicates that the value jump is not low, the process 700 may proceed to block 735 where the filter state is evaluated. The filter state may be characterized by various features represented by decision blocks 740-760. At decision block 740, the vehicle computer 115 evaluates whether the lookahead offset is back to center. If so, the process 700 may proceed to block 720 so the low filter may be applied. Otherwise, the process 700 may proceed to decision block 745. At decision block 745, the vehicle computer 115 may evaluate whether the SPP model has changed. If so, the process 700 may proceed to block 750 where the vehicle computer 115 evaluates whether the SPP confidence is not low (i.e., the confidence is either medium or high). If the SPP confidence is not low, the process 700 may proceed to block 720 so the low filter may be applied. If the SPP confidence is low, the process 700 may proceed to decision block 755 where the vehicle computer 115 evaluates whether the host vehicle 100 is operating in the PO-only mode and driving on a straight road. If yes, the process 700 may proceed to block 710 so the coasting filter may be applied. Otherwise, the process 700 may proceed to block 730 so the high filter may be applied. Returning now to the "no" result of block 745, which may occur when the SPP model has not changed, the process 700 may proceed to decision block 760 where the vehicle computer 115 evaluates whether the value has jumped after the SPP model change occurred. If not, the process 700 returns to block 735 to reevaluate filter state. Otherwise, the process 700 proceeds to block 765 where a moderate filter is applied. The process 700 may proceed to block 705 from block 765 when, e.g., another value jump occurs.

In general, the computing systems and/or devices described may employ any of a number of computer operating systems, including, but by no means limited to, versions and/or varieties of the Ford Sync® application, AppLink/Smart Device Link middleware, the Microsoft Automotive® operating system, the Microsoft Windows® operating system, the Unix operating system (e.g., the Solaris® operating system distributed by Oracle Corporation of Redwood Shores, Calif.), the AIX UNIX operating system distributed by International Business Machines of Armonk, N.Y., the Linux operating system, the Mac OSX and iOS operating systems distributed by Apple Inc. of Cupertino, Calif., the BlackBerry OS distributed by Blackberry, Ltd. of Waterloo, Canada, and the Android operating system developed by Google, Inc. and the Open Handset Alliance, or the QNX® CAR Platform for Infotainment offered by QNX Software Systems. Examples of computing devices include, without limitation, an on-board vehicle computer, a computer workstation, a server, a desktop, notebook, laptop, or handheld computer, or some other computing system and/or device.

Computing devices generally include computer-executable instructions, where the instructions may be executable by one or more computing devices such as those listed above. Computer-executable instructions may be compiled or interpreted from computer programs created using a variety of programming languages and/or technologies, including, without limitation, and either alone or in combination, Java™, C, C++, Visual Basic, Java Script, Perl, etc. Some of these applications may be compiled and executed on a virtual machine, such as the Java Virtual Machine, the Dalvik virtual machine, or the like. In general, a processor (e.g., a microprocessor) receives instructions, e.g., from a memory 125, a computer-readable medium, etc., and executes these instructions, thereby performing one or more processes, including one or more of the processes described herein. Such instructions and other data may be stored and transmitted using a variety of computer-readable media.

A computer-readable medium (also referred to as a processor-readable medium) includes any non-transitory (e.g., tangible) medium that participates in providing data (e.g., instructions) that may be read by a computer (e.g., by a processor of a computer). Such a medium may take many forms, including, but not limited to, non-volatile media and volatile media. Non-volatile media may include, for example, optical or magnetic disks and other persistent memory. Volatile media may include, for example, dynamic random access memory (DRAM), which typically constitutes a main memory. Such instructions may be transmitted by one or more transmission media, including coaxial cables, copper wire and fiber optics, including the wires that comprise a system bus coupled to a processor of a computer. Common forms of computer-readable media include, for example, a floppy disk, a flexible disk, hard disk, magnetic tape, any other magnetic medium, a CD-ROM, DVD, any other optical medium, punch cards, paper tape, any other physical medium with patterns of holes, a RAM, a PROM, an EPROM, a FLASH-EEPROM, any other memory chip or cartridge, or any other medium from which a computer can read.

Databases, data repositories or other data stores described herein may include various kinds of mechanisms for storing, accessing, and retrieving various kinds of data, including a hierarchical database, a set of files in a file system, an application database in a proprietary format, a relational database management system (RDBMS), etc. Each such data store is generally included within a computing device employing a computer operating system such as one of those mentioned above, and are accessed via a network in any one or more of a variety of manners. A file system may be accessible from a computer operating system, and may include files stored in various formats. An RDBMS generally employs the Structured Query Language (SQL) in addition to a language for creating, storing, editing, and executing stored procedures, such as the PL/SQL language mentioned above.

In some examples, system elements may be implemented as computer-readable instructions (e.g., software) on one or more computing devices (e.g., servers, personal computers, etc.), stored on computer readable media associated therewith (e.g., disks, memories, etc.). A computer program product may comprise such instructions stored on computer readable media for carrying out the functions described herein.

With regard to the processes, systems, methods, heuristics, etc. described herein, it should be understood that, although the steps of such processes, etc. have been described as occurring according to a certain ordered sequence, such processes could be practiced with the described steps performed in an order other than the order described herein. It further should be understood that certain steps could be performed simultaneously, that other steps could be added, or that certain steps described herein could be omitted. In other words, the descriptions of processes herein are provided for the purpose of illustrating certain embodiments, and should in no way be construed so as to limit the claims.

Accordingly, it is to be understood that the above description is intended to be illustrative and not restrictive. Many embodiments and applications other than the examples provided would be apparent upon reading the above description. The scope should be determined, not with reference to the above description, but should instead be determined with reference to the appended claims, along with the full scope of equivalents to which such claims are entitled. It is anticipated and intended that future developments will occur in the technologies discussed herein, and that the disclosed systems and methods will be incorporated into such future embodiments. In sum, it should be understood that the application is capable of modification and variation.

All terms used in the claims are intended to be given their ordinary meanings as understood by those knowledgeable in the technologies described herein unless an explicit indication to the contrary is made herein. In particular, use of the singular articles such as "a," "the," "said," etc. should be read to recite one or more of the indicated elements unless a claim recites an explicit limitation to the contrary.

The Abstract is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

Then invention claimed is:

1. A vehicle computer comprising:
    a memory; and
    a processor programmed to execute instructions stored in the memory, the instructions including determining a first lane center, autonomously operating a host vehicle relative to the first lane center, detecting a change in the first lane center to a second lane center, selecting a filter, and applying the filter while transitioning autonomous operation of the host vehicle from the first lane center to the second lane center;
    wherein one or more of (a) selecting from among at least one of a low filter, a moderate filter, a high filter, and a coasting filter, (b) determining a steerable path prediction confidence level and selecting the filter according to the steerable path prediction confidence level, or (c) detecting a steerable path prediction model change and selecting the filter according to the steerable path prediction model change, is or are included in selecting the filter.

2. The vehicle computer of claim 1, wherein the first lane center is defined by a first lane marker and a second lane marker and wherein the second lane center is defined by the first lane marker and not the second lane marker.

3. The vehicle computer of claim 2, wherein the processor is programmed to detect the first lane marker and the second lane marker from an image captured by a camera.

4. The vehicle computer of claim 3, wherein the processor is programmed to detect the first lane marker and the second lane marker by applying an image processing technique to the image captured by the camera.

5. The vehicle computer of claim 1, wherein selecting from among at least one of a low filter, a moderate filter, a high filter, and a coasting filter is included in selecting the filter.

6. The vehicle computer of claim 5, wherein selecting and applying the low filter causes the processor to move the host vehicle toward the second lane center more quickly than selecting and applying the coasting filter, the high filter, or the moderate filter.

7. The vehicle computer of claim 6, wherein selecting and applying the moderate filter causes the processor to move the host vehicle toward the second lane center more quickly than selecting and applying the coasting filter or the high filter.

8. The vehicle computer of claim 7, wherein selecting and applying the high filter causes the processor to move the host vehicle toward the second lane center more quickly than selecting and applying the coasting filter.

9. The vehicle computer of claim 1, wherein selecting the filter includes determining a steerable path prediction confidence level and selecting the filter according to the steerable path prediction confidence level is included in selecting the filter.

10. The vehicle computer of claim 1, wherein selecting the filter includes detecting a steerable path prediction model change and selecting the filter according to the steerable path prediction model change is included in selecting the filter.

11. A vehicle lane centering system comprising:
a camera programmed to capture a first image of an area ahead of a host vehicle, the image including a first lane marker and a second lane marker; and
a processor programmed to process the first image to determine a first lane center based on the first lane marker and the second lane marker and autonomously operate the host vehicle relative to the first lane center,
wherein the camera is programmed to capture a second image including the first lane marker and not the second lane marker, and wherein the processor is programmed to process the second image to determine a second lane center different from the first lane center, select a filter, and apply the filter while transitioning autonomous operation of the host vehicle from the first lane center to the second lane center;
wherein one or more of (a) selecting from among at least one of a low filter, a moderate filter, a high filter, and a coasting filter, (b) determining a steerable path prediction confidence level and selecting the filter according to the steerable path prediction confidence level, or (c) detecting a steerable path prediction model change and selecting the filter according to the steerable path prediction model change, is or are included in selecting the filter.

12. The vehicle lane centering system of claim 11, wherein the first lane center is defined by a first lane marker and a second lane marker and wherein the second lane center is defined by the first lane marker and not the second lane marker.

13. The vehicle lane centering system of claim 12, wherein the processor is programmed to detect the first lane marker and the second lane marker in the first image by applying an image processing technique to the first image captured by the camera and wherein the processor is programmed to detect the first lane marker in the second image by applying the image processing technique to the second image captured by the camera.

14. The vehicle lane centering system of claim 11, wherein selecting from among at least one of a low filter, a moderate filter, a high filter, and a coasting filter is included in selecting the filter.

15. The vehicle lane centering system of claim 14, wherein selecting and applying the low filter causes the processor to move the host vehicle toward the second lane center more quickly than selecting and applying the coasting filter, the high filter, or the moderate filter.

16. The vehicle lane centering system of claim 15, wherein selecting and applying the moderate filter causes the processor to move the host vehicle toward the second lane center more quickly than selecting and applying the coasting filter or the high filter.

17. The vehicle lane centering system of claim 16, wherein selecting and applying the high filter causes the processor to move the host vehicle toward the second lane center more quickly than selecting and applying the coasting filter.

18. The vehicle lane centering system of claim 11, wherein determining a steerable path prediction confidence level and selecting the filter according to the steerable path prediction confidence level is included in selecting the filter.

19. The vehicle lane centering system of claim 11, wherein detecting a steerable path prediction model change and selecting the filter according to the steerable path prediction model change is included in selecting the filter.

* * * * *